US011498680B1

(12) United States Patent
Montgomery et al.

(10) Patent No.: US 11,498,680 B1
(45) Date of Patent: Nov. 15, 2022

(54) STEP ASSEMBLY FOR HELICOPTER

(71) Applicants: Corey Montgomery, Bayside, TX (US); Michael Hatch, Robstown, TX (US)

(72) Inventors: Corey Montgomery, Bayside, TX (US); Michael Hatch, Robstown, TX (US)

( * ) Notice: Subject to any disclaimer, the term of this patent is extended or adjusted under 35 U.S.C. 154(b) by 894 days.

(21) Appl. No.: 16/372,008

(22) Filed: Apr. 1, 2019

(51) Int. Cl.
*B64D 9/00* (2006.01)
*B64C 1/24* (2006.01)

(52) U.S. Cl.
CPC .................. *B64D 9/00* (2013.01); *B64C 1/24* (2013.01); *B60Y 2200/52* (2013.01)

(58) Field of Classification Search
CPC ....... B64D 9/00; B60Y 2200/52; B64C 25/52; B64C 1/24
See application file for complete search history.

(56) References Cited

U.S. PATENT DOCUMENTS

| 2,383,930 | A | * | 8/1945 | Reynolds | B64C 1/24 280/166 |
| 2,558,975 | A | * | 7/1951 | Moreno | B64C 1/24 114/65 R |
| 3,904,155 | A | * | 9/1975 | Chavis | B64C 27/00 224/558 |
| 5,806,627 | A | * | 9/1998 | Wilson | B64C 1/24 182/127 |
| 7,780,394 | B1 | * | 8/2010 | Becker | B60P 1/4414 414/467 |

\* cited by examiner

*Primary Examiner* — Christopher D Hutchens
*Assistant Examiner* — Steven J Shur
(74) *Attorney, Agent, or Firm* — James E. Walton

(57) ABSTRACT

A removable step assembly for a helicopter includes a main tube, which supports a forward step and a rear step, as well as a bushing housing. The main tube is mounted to a helicopter by the bushing housing, an associated bushing, and by an adapter assembly that is secured to the cabin of the helicopter.

16 Claims, 2 Drawing Sheets

STEP ASSEMBLY FOR HELICOPTER

BACKGROUND

1. Field of the Invention

The present invention relates generally to steps for pilot and passenger use on helicopters.

2. Description of Related Art

Helicopters often require the use of steps for pilots and/or passengers to easily get into and out of the aircraft. Helicopters commonly make use of a step that is permanently attached to the fuselage or landing skids, although these steps are often removable.

Some helicopters are designed for passengers sit in the open doorways of the cabin and hang their feet and legs out of the aircraft. For example, helicopters used for hunting and wildlife management are usually adapted to allow one or more passengers to sit facing out of the cabin doors in order to hunt or capture wildlife animals. These helicopters used by hunters and wildlife management personnel often have one or more steps or platforms attached to the cabin and/or the skid gear that provide support for the hunter while he is leaning outside the cabin of the helicopter.

Although great strides have been made in the area of steps for helicopters, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
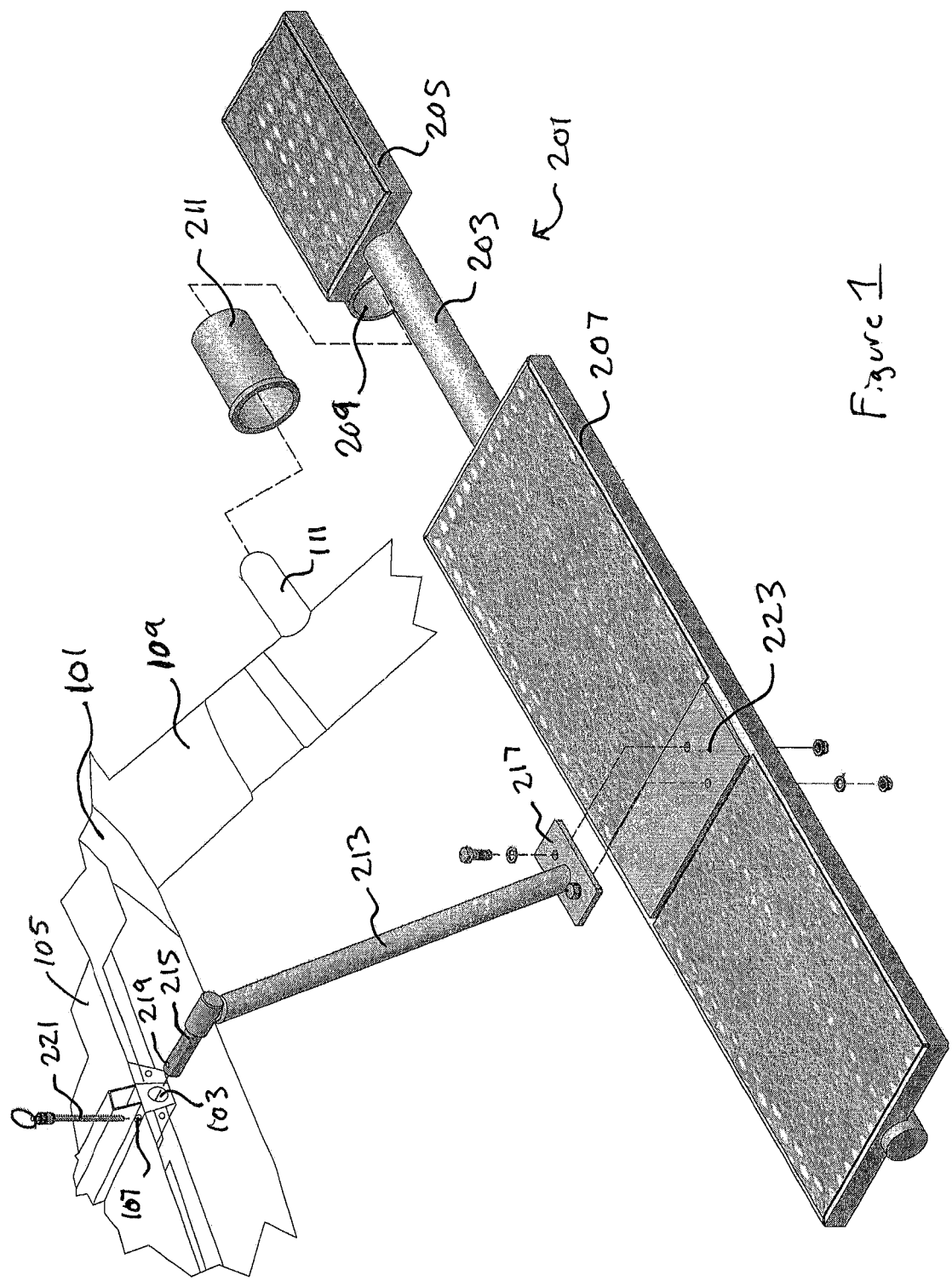
FIG. 1 is an exploded rear perspective view of a right-hand helicopter step assembly according to the preferred embodiment of the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, combinations, and alternatives falling within the spirit and scope of the present application as defined by the appended claims.

DETAILED DESCRIPTION OF THE PREFERRED EMBODIMENT

There is a need for a system that provides not only a step for getting in and out of a helicopter, but also for providing a foot rest or support for users during flight. Preferably, the system is easily installed on and removed from the helicopter without any permanent modification or attachment.

Illustrative embodiments of the step assembly for helicopter according to the present application are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIG. 1 in the drawings, an exploded perspective view of a right-hand side step assembly 201 for a helicopter 101 is illustrated. Only a portion of helicopter 101 is shown, including a mounting aperture 103 formed in the right-hand side of helicopter 101 beneath the right-hand doorway of the passenger cabin. Aperture 103 extends underneath a subfloor 105 of the passenger cabin towards the interior of helicopter 101. A pin hole 107 is formed through subfloor 105 and extends into mounting aperture 103. Helicopter 101 preferably has a floor (not shown) supported above subfloor 105. It should be understood that, in order for a pin 221 to be inserted into and removed from pin hole 107 from within the passenger cabin, an access hole (not shown) must be formed through the floor above pin hole 107.

Helicopter 101 includes a right front landing skid support, or cross-tube, 109 on the right-hand side thereof. A front step 111 is formed on front landing skid support 109 for a pilot or co-pilot to climb into the cockpit of helicopter 101. Front step 111 is preferably a circular pipe or rod extending forward from front landing skid support 109. Front step 111 may be an existing step or post on helicopter 101, or be a component part of step assembly 201 that is connected to skid support 109.

Step assembly 201 generally comprises a main tube 203, which supports a forward step 205 and a rear step 207, as well as a bushing housing 209. Main tube 203 is mounted to helicopter 101 by bushing housing 209, an associated bushing 211, and by an adapter assembly 213. Main tube 203 may be formed from a single tube, or may be formed from multiple components. In addition, main tube 203 may be generally straight, or may be bent or curved into various desirable shapes. Adapter assembly 213 is a preferably metal rod having an upper end that supports an adapter pin shaft 215 and a lower end that supports an adapter mounting plate 217. Adapter pin shaft 215 fits into aperture 103, and pin 221 extends through pin hole 107 into a shaft pin hole 219 in adapter pin shaft 215 to secure adapter assembly 213 to helicopter 101. Forward step 205 and rear step 207 may be integrally formed into a single step. The length of main tube 203 may be adjustable. For example, main tube 203 may comprise multiple sections that telescope together.

Main tube 203 is preferably a single length of metal tubing or piping. Forward step 205 and rear step 207 are preferably rectangular steps made from folded sheet metal, stamped sheet metal, diamond plate sheet metal, or other suitable materials, and/or may be treated and/or coated with selected materials to provide slip resistance, and are permanently attached to main tube 203, preferably on the upper surface of main tube 203. Forward step 205 is also supported by bushing housing 209, which is attached to the inboard side of main tube 203 beneath forward step 205. Bushing housing 209 is preferably a length of metal tube supported by main tube 203 relative to adapter assembly 213, such that bushing housing 209 fits generally around front step 111b on front landing skid support 109. The diameter of the opening of bushing housing 209 is sufficiently larger that the diameter of front step 111, such that bushing 211 is necessary for the proper support of step assembly 201. Bushing 211 is preferably a length of tubing of a durable material such as rubber, polymer, or composite that is sized to fit onto front step 111 and into bushing housing 209, to prevent wear on front step 111.

Before step assembly 201 is mounted to helicopter 101, bushing 211 is placed over front step 111. When step assembly 201 is mounted to helicopter 101, bushing housing 209 is slid onto bushing 211 on front step 111, thereby supporting main tube 203 and forward step 205. Alternatively, rather than using a bushing, front step 111 may simply be wrapped in an adhesive tape or cloth to such an extent that the wrapped front step 111 fits securely into bushing housing 209 without the need for bushing 211.

Adapter mounting plate 217 on adapter assembly 213 removably mounts to a step mounting plate 223 formed on the top of rear step 207, preferably with removable fasteners, such as nuts and bolts. Other embodiments may utilize other removable coupling methods. For example, adapter assembly 213 may utilize a locking clamp that attaches to an underside of main tube 203, or adapter assembly 213 may utilize a pin or ring that extends through a mounting point on top of rear step 207.

Figure 2:
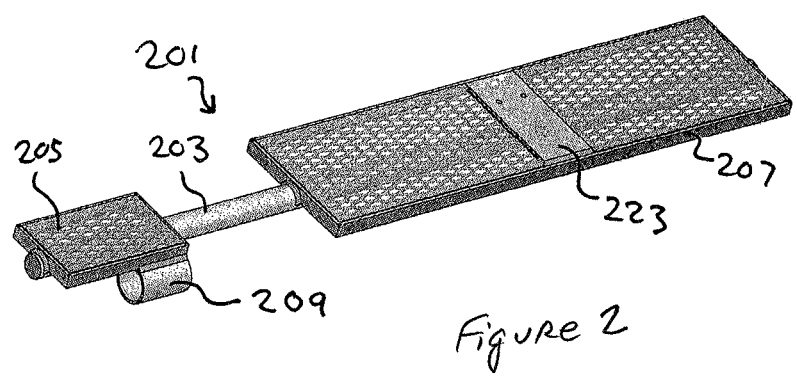
FIG. 2 is a forward perspective view of the helicopter step assembly of FIG. 1.

Referring now also to FIG. 2 in the drawings, step assembly 201 is shown as having separate and distinct forward and rear steps 205 and 207. This enables main tube 203 to be supported directly adjacent front landing skid support 109, which increases the rigidity within step assembly 201 relative to an embodiment wherein main tube 203 is disposed further from front landing skid support 109. However, other embodiments may utilize one single step that is supported by both adapter assembly 213 and bushing housing 209 and runs along the length of main tube 203.

According to the preferred embodiment, adapter assembly 213 is a single rigid piece, and bushing housing 209 is permanently attached to main tube 203. Bushing housing 209 may also be connected to forward step 205 by welding an inner edge of step 205 adjacent bushing housing 209 to a surface of bushing housing 209. Other embodiments of step assembly 201 may be height adjustable. For example, adapter assembly 213 may be a translating design, and bushing housing 209 may be attached to main tube 203 with a translating bracket, such that forward step 205 and rear step 207 on main tube 203 may translate with respect to the helicopter. The specific direction of such translation will be determined by the specific physical designs of such a system, but the translation will primarily be up and down such that the step adjusts its height relative to helicopter 101 and to the ground. Because of the angle of the helicopter landing skid supports, such a translating step assembly would also translate somewhat inwardly toward and outwardly away from helicopter 101, the step assembly translating away from helicopter 101 as it translates downward into a lower step positon and translating inward toward helicopter 101 as it translates upward into an upper step position.

According to the preferred embodiment, only a single level of steps comprising forward step 205 and rear step 207 is present. However, alternative designs of a helicopter step assembly using a same or similar mounting system might have multiple levels of steps. For example, while forward step 205 and rear step 207 are mounted to the top of main tube 203, a multi-level step design could utilize a bracket permanently or removably attached to the bottom of main tube 203 that includes a lower forward step and a lower rear step, thereby creating a second level of steps for passengers and pilots to use when entering or exiting helicopter 101. Depending upon the design of the helicopter and the design objectives for a step assembly, alternative step assemblies with multiple levels of steps could use separate forward and rear steps similar to step assembly 201, or could use multiple levels of single full-length steps, or could alternate between multi-step levels and full-length step levels.

As provided above, step assembly 201 is configured for use on the right-hand side of helicopter 101 having a skid-located mounting point and a cockpit or cabin mounting point. Step assembly 201 for the right-hand side of a helicopter may be accompanied by a matching or corresponding step assembly for the left-hand side of a helicopter. it will be appreciated that a left-hand step assembly would be a mirror image of step assembly 210; however, depending upon the design of the left-hand side of the helicopter, minor modifications may be made to such a left-hand step assembly.

Figure 3:
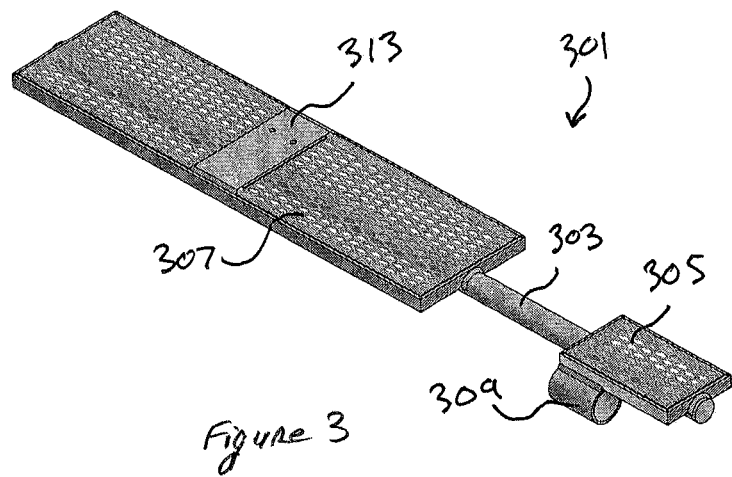
FIG. 3 is a forward perspective view of a left-hand helicopter step assembly according to the preferred embodiment of the present application.

Referring now also to FIG. 3 in the drawings, a left-hand aircraft step assembly 301 is shown. Whereas step assembly 201 is configured to mount to a right-hand side of helicopter 101, step assembly 301 is configured to mount to a left-hand side of helicopter 101. Step assembly 301 should be understood to be a mirror image version of step assembly 201, except as otherwise specified. Step assembly 301 has a main tube 303 the same or substantially similar as main tube 203. Main tube 203 supports a forward step 305 and a rear step 307. Main tube 203 also supports bushing housing 309. Bushing housing 309 is similar to bushing housing 209, except that bushing housing 309 is mounted on a right side of forward step 305, whereas bushing housing 209 is mounted on a left side of forward step 205. The bushing housings 209, 309 are mounted to whichever side of their step assemblies 201, 301 are adjacent helicopter 101. Bushing housing 309 contains a bushing (not shown) that is the same as or substantially similar to bushing 211.

Step assembly 301 may make use of adapter assembly 213 to mount to helicopter 101. Adapter assembly 213 as shown in FIG. 1 is a symmetrical design that works with both step assembly 201 and step assembly 301. Step assembly 301 preferably mounts to helicopter 101 similarly to step assembly 201. In this version, adapter mounting plate 217 secures to step mounting plate 313 on top of rear step 307, preferably via two bolts. The bushing is fitted onto the left hand front step (similar to front step 111), and bushing housing 309 fits over and secures onto the bushing.

As provided above with respect to step assembly 201, step assembly 301 may make use full-lengths steps, or other multiple-step designs, and make include multiple levels of steps as opposed to the single-level design shown. Though step assemblies 301 and 201 are preferably used together, a pilot or operator may choose to use only step assembly 201 without using step assembly 301, or vice versa, depending on the use of helicopter 101. Furthermore, though step assemblies 301 and 201 and preferably mirror each other, a pilot or operator may wish to use a step assembly 201 with a forward and rear step as shown, while using a step assembly 301 with a full-length step, or may choose to use a step assembly 201 having a single level of steps while using a step assembly 301 having two or more levels of steps.

As described above, step assemblies 201, 301 rigidly mount to helicopter 101 by a preferably fixed adapter assembly 213. Alternatively, as provided above, step assemblies 201, 301 may translate with respect to helicopter 101.

Step assemblies 201, 301 may be used with an adapter assembly that interfaces with helicopter 101 in the same or similar way as step assembly 213 but is adjustable. For example, adapter assembly 213 might be modified to use a telescoping pipe, and accompanying telescoping mounting brackets would adapt bushing housings 209, 309 to front steps 111, thereby making step assemblies 201, 301 height adjustable.

Adapter assembly 213 might be modified to mount to step assemblies 201, 301 by a locking hinge or a hinge with limited range of motion such that step assemblies 201, 301 might be moved between a folded position and a deployed position. For example, adapter assembly 213, as modified, might couple to a hinge extending beneath rear step 207, 307 from main tube 203, 303. The hinge may be coaxial with bushing housing 209, 309 such that step assembly 201, 301 pivots about front step 111b, 111a on helicopter 101. In such a design, bushing housing 209, 309 may be supported farther from main tube 203, 303 than illustrated so that such the folded position would place step assembly 201, 301 adjacent or just beneath the cabin of helicopter 101.

It will be appreciated that the component parts, materials, and assembly procedures for step systems 201, 301 preferably satisfy various regulatory safety requirements, such as Federal Aviation Administration guidelines.

It is apparent that a system with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description and claims. Although the present embodiments are shown above, they are not limited to just these embodiments, but are amenable to various changes and modifications without departing from the spirit thereof.

We claim:

1. A step assembly for a helicopter having a skid support, the step assembly comprising:
    a main tube configured for releasable attachment to the skid support;
    a forward step supported by the main tube;
    a rear step supported by the main tube;
    an adapter assembly coupled to the rear step, the adapter assembly being configured for releasable attachment to the helicopter;
    an adapter rod;
    an adapter pin shaft disposed on an upper end of the adapter rod, the adapter pin shaft being sized and shaped for installation beneath a floor of the helicopter; and
    an adapter mounting plate disposed on a lower end of the adapter rod, the adapter mounting plate being configured, such that the adapter assembly is releasably coupled to the rear step.

2. The step assembly according to claim 1, further comprising:
    a bushing housing attached to the main tube underneath the forward step, the bushing housing being sized and shaped to fit over a post extending from the skid support of the helicopter.

3. The step assembly according to claim 2, further comprising:
    a bushing disposed between the bushing housing and the post.

4. The step assembly according to claim 1, further comprising:
    a step mounting plate disposed on the rear step for receiving the adapter mounting plate.

5. The step assembly according to claim 1, further comprising:
    a removable pin configured to pass through the floor of the helicopter and into the adapter pin shaft to secure the adapter assembly to the helicopter.

6. The step assembly according to claim 2, wherein the bushing housing slips over the post in a rearward direction.

7. The step assembly according to claim 1, further comprising:
    at least one additional step supported by the main tube.

8. The step assembly according to claim 1, wherein the forward step and rear step are integrally connected to form a single step.

9. The step assembly according to claim 1, wherein the forward step is formed from one or more of the following:
    folded sheet metal;
    stamped sheet metal; and
    diamond plate sheet metal.

10. The step assembly according to claim 1, where in the rear step is formed by one or more of the following:
    folded sheet metal;
    stamped sheet metal; and
    diamond plate sheet metal.

11. The step assembly according to claim 1, wherein the forward step is treated with a slip resistant material.

12. The step assembly according to claim 1, wherein the rear step is treated with a slip resistant material.

13. The step assembly according to claim 1, wherein the main tube is generally straight.

14. The step assembly according to claim 1, wherein the main tube is bent.

15. The step assembly according to claim 1, wherein the length of the main tube is adjustable.

16. The step assembly according to claim 1, wherein the height of the adapter assembly is adjustable.

* * * * *